(12) United States Patent
Torrado et al.

(10) Patent No.: US 7,467,530 B2
(45) Date of Patent: Dec. 23, 2008

(54) VEHICLE LOCK

(75) Inventors: Mark Torrado, New Hampton, NY (US); Eric Xavier, New Hampton, NY (US); Adam Xavier, New Hampton, NY (US)

(73) Assignee: New Hampton Technologies LLC, Middletown, NY (US)

( * ) Notice: Subject to any disclaimer, the term of this patent is extended or adjusted under 35 U.S.C. 154(b) by 0 days.

(21) Appl. No.: 11/350,573

(22) Filed: Feb. 9, 2006

(65) Prior Publication Data

US 2007/0022791 A1 Feb. 1, 2007

Related U.S. Application Data

(60) Provisional application No. 60/703,745, filed on Jul. 29, 2005.

(51) Int. Cl.
*E05B 67/36* (2006.01)

(52) U.S. Cl. ............... 70/33; 70/56; 70/209; 70/227; 70/233; 70/237; 188/265

(58) Field of Classification Search ........... 70/225–228, 70/237, 233, 209, 32–34, 2, 56; 188/265
See application file for complete search history.

(56) References Cited

U.S. PATENT DOCUMENTS

| | | | |
|---|---|---|---|
| 1,140,209 A | | 5/1915 | Taylor |
| 3,914,965 A | * | 10/1975 | Paxton ........................ 70/34 |
| 3,968,985 A | * | 7/1976 | Nielsen et al. ............. 292/340 |
| 4,013,311 A | * | 3/1977 | Prezioso ..................... 292/59 |
| 4,033,159 A | | 7/1977 | Bennett |
| 4,038,847 A | | 8/1977 | Bennett |
| 4,133,193 A | | 1/1979 | Sanada et al. |
| 4,171,823 A | | 10/1979 | Nemes |
| 4,294,090 A | | 10/1981 | Metzger |
| 4,986,096 A | * | 1/1991 | Soehner et al. .............. 70/54 |
| 5,133,201 A | | 7/1992 | LaMott et al. |
| 5,265,451 A | | 11/1993 | Phifer |
| 5,291,761 A | | 3/1994 | Lii |
| 5,345,794 A | * | 9/1994 | Jenks ........................... 70/14 |
| D352,223 S | | 11/1994 | Shieh |
| 5,365,758 A | | 11/1994 | Shieh |
| 5,379,618 A | | 1/1995 | Shieh |

(Continued)

FOREIGN PATENT DOCUMENTS

DE 10316708 A1 11/2003

(Continued)

*Primary Examiner*—Suzanne D Barrett
(74) *Attorney, Agent, or Firm*—Fish & Richardson P.C.

(57) ABSTRACT

The vehicle brake-rotor lock includes a mounting bracket, and a lock mechanism, including at least one deadbolt shaft, which is preferably made of steel, stainless steel, titanium, tungsten, boron, or any other dense metal, used to mechanically immobilize the vehicle. The bracket is preferably permanently attached to the protected vehicle. In a locked state, the deadbolt shaft extends through a cross-drilled ventilation hole or slot on the brake rotor of the vehicle, thereby preventing rotation of the brake rotor and the wheel. The lock mechanism preferably prevents any forward or rearward movement of the vehicle when engaged to allow for a heightened security for any vehicle using a disc braking system. In one embodiment, the lock mechanism is mechanically actuated. In another embodiment, the lock mechanism is electronically actuated.

16 Claims, 4 Drawing Sheets

U.S. PATENT DOCUMENTS

| | | |
|---|---|---|
| 5,388,436 A | 2/1995 | Shieh |
| 5,442,941 A | 8/1995 | Kahonen et al. |
| 5,467,618 A | 11/1995 | Shieh |
| 5,492,206 A | 2/1996 | Shieh |
| 5,499,518 A | 3/1996 | Shieh |
| 5,507,160 A | 4/1996 | Shieh |
| 5,515,947 A | 5/1996 | Shieh |
| 5,517,837 A | 5/1996 | Wang |
| 5,530,427 A | 6/1996 | Shieh |
| 5,694,797 A | 12/1997 | Kuo |
| D391,832 S | 3/1998 | McDaid |
| 5,730,012 A | 3/1998 | Link |
| 5,736,924 A | 4/1998 | Shieh |
| 5,819,889 A | 10/1998 | Shieh |
| 5,916,279 A | 6/1999 | Shieh |
| 5,946,952 A * | 9/1999 | Mintchenko ............... 70/2 |
| 5,964,107 A | 10/1999 | Chang |
| 6,009,731 A * | 1/2000 | Emmons et al. ............ 70/56 |
| 6,178,787 B1 | 1/2001 | Titterton |
| 6,199,416 B1 | 3/2001 | Wu |
| 6,394,283 B1 | 5/2002 | Fletcher |
| 6,437,459 B1 | 8/2002 | Politi |
| 6,457,336 B1 | 10/2002 | Bremicker |
| 6,464,269 B1 * | 10/2002 | Wilhelm et al. ......... 292/307 R |
| 6,497,300 B2 | 12/2002 | Mori et al. |
| 6,553,793 B1 | 4/2003 | Chen |
| 6,615,624 B2 * | 9/2003 | Cardwell ................... 70/226 |
| 6,981,954 B2 | 1/2006 | Huang |
| 6,994,192 B1 | 2/2006 | Chang |
| 7,076,976 B1 * | 7/2006 | Goldman .................. 70/33 |
| 7,080,530 B2 * | 7/2006 | Haas ......................... 70/26 |
| 2003/0188938 A1 | 10/2003 | Li |
| 2005/0103584 A1 | 5/2005 | Hogesta |
| 2005/0252257 A1 | 11/2005 | Woods et al. |

FOREIGN PATENT DOCUMENTS

| | | |
|---|---|---|
| EP | 0676318 A2 | 10/1995 |
| EP | 0716007 A1 | 6/1996 |
| EP | 1479599 A2 | 11/2004 |
| GB | 2292920 A | 3/1996 |
| GB | 2310839 A | 9/1997 |
| TW | 519075 Y | 1/2003 |
| WO | 03/051707 A2 | 6/2003 |

* cited by examiner

VEHICLE LOCK

REFERENCE TO RELATED APPLICATIONS

This application claims an invention which was disclosed in Provisional Application No. 60/703,745, filed Jul. 29, 2005, entitled "RECREATIONAL VEHICLE LOCK". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of locks. More particularly, the invention pertains to vehicle locks.

2. Description of Related Art

Two major problems exist with currently available rotor locks for motorcycles and other recreational-type vehicles. First, they do not eliminate fore and aft movement of the wheel or track. Second, when not in use, i.e. when the lock is in an unlocked state, they must be stored somewhere other than on the motorcycle wheel.

When using immobilizers on vehicles, such as motorcycles, mopeds, ATVs, and snowmobiles, there is a need to prevent the possibility of accidental damage to the rotor, caliper, or wheel rim of the vehicle. To satisfy this requirement, it is necessary to eliminate any and all forward or rearward slack between the immobilizing member and the rotor, caliper, or wheel of the vehicle.

One drawback to conventional external locking mechanisms on vehicle braking systems is the slack in the locking point. This slack can cause damage to braking parts when forward and rearward movement takes place. Conventional locking mechanisms offer some wheel immobilization, but allow room for unwanted forward and rearward movement.

Additionally, the application of external locking mechanisms of the prior art creates the possibility of locking mechanism misplacement and locking mechanism storage difficulties on small vehicles. Externally applied locking mechanisms need to be placed into storage when the vehicle is in use, therefore creating a burden on the user to find a storage location. This inconvenience to the user may lead the user to avoid using the vehicle lock on a regular basis. Therefore, there is a need in the art for both a fully immobilizing rotor lock and a permanently mounted rotor lock that remains on the vehicle, does not need to be stored, and is much more convenient for the user.

SUMMARY OF THE INVENTION

The vehicle brake-rotor lock includes a mounting bracket, and a lock mechanism, including at least one deadbolt shaft, which is preferably made of steel, stainless steel, titanium, tungsten, boron, or any other dense metal, used to mechanically immobilize the vehicle. The bracket is preferably permanently attached to the protected vehicle. In a locked state, the deadbolt shaft extends through a cross-drilled ventilation hole or slot on the brake rotor of the vehicle, thereby preventing rotation of the brake rotor and the wheel. The lock mechanism preferably prevents any forward or rearward movement of the vehicle when engaged to allow for a heightened security for any vehicle using a disc braking system. In one embodiment, the lock mechanism is mechanically actuated. In another embodiment, the lock mechanism is electronically actuated.

In a first embodiment, the vehicle lock is for a vehicle having at least one wheel or track having a brake rotor with a plurality of ventilation holes or slots. The vehicle lock includes a lock body mounted to the vehicle and a locking mechanism including at least one deadbolt shaft mounted in the lock body in a locked state. In an unlocked state, the deadbolt shaft remains clear of the brake rotor, thereby allowing the brake rotor and the wheel or track to rotate. In the locked state the deadbolt shaft extends through at least one of the ventilation holes or slots, thereby preventing rotation of the brake rotor and the wheel or track. The lock body is preferably mounted to the vehicle in both the locked state and the unlocked state. The lock body preferably replaces the caliper housing or the caliper mounting bracket of the vehicle.

The locking mechanism preferably further includes a brake bolt including a brake bolt body having a central bore, the deadbolt shaft extending from the central bore, and a deadbolt spring. The deadbolt spring is located in the central bore and biases the deadbolt shaft outward from the brake bolt body. For operation of the vehicle in the unlocked state, the brake bolt is removed from the lock body. The brake bolt preferably includes a keychain loop mounted to the brake bolt body. A locking pin located in the lock body is biased toward the brake bolt by a locking pin spring. A lock cylinder is actuated between a lock position and an unlock position by a key such that in the lock position, the lock cylinder allows the locking pin to extend to lock the brake bolt in the brake body. The lock body preferably flanks both sides of at least part of the brake rotor such that in the locked state the deadbolt shaft extends from the brake bolt body through the at least one ventilation hole or slot and into a recess in the brake body. The deadbolt shaft preferably extends through a first bushing at the end of the brake bolt and in the locked state the deadbolt shaft extends into a second bushing in the recess.

The deadbolt shaft is preferably sized such that in the locked state all fore and aft movement of the wheel or track is prevented. The deadbolt shaft is preferably made of steel, hardened steel, stainless steel, tungsten, titanium, or boron.

In one embodiment, the lock mechanism is mechanically actuated by a key. In another embodiment, the lock mechanism is electronically actuated by turning an ignition key of the vehicle on and off.

The vehicle lock may further include at least one light-emitting diode mounted to the vehicle lock for indicating whether the lock is in the locked state or the unlocked state.

A method of providing a vehicle lock includes removing the bracket or housing from the vehicle and permanently mounting the vehicle lock in place of the bracket or housing. The vehicle lock includes a lock body mounted to the vehicle and a locking mechanism including at least one deadbolt shaft aligned to extend into at least one of the plurality of ventilation holes or slots to lock the vehicle.

In another embodiment, the vehicle lock includes a lock body mounted to the vehicle and a locking mechanism including at least one deadbolt shaft mounted in the lock body and extending into a ventilation hole or slot of the brake rotor in a locked state. The lock body is permanently mounted to the vehicle.

DETAILED DESCRIPTION OF THE INVENTION

Figure 1:
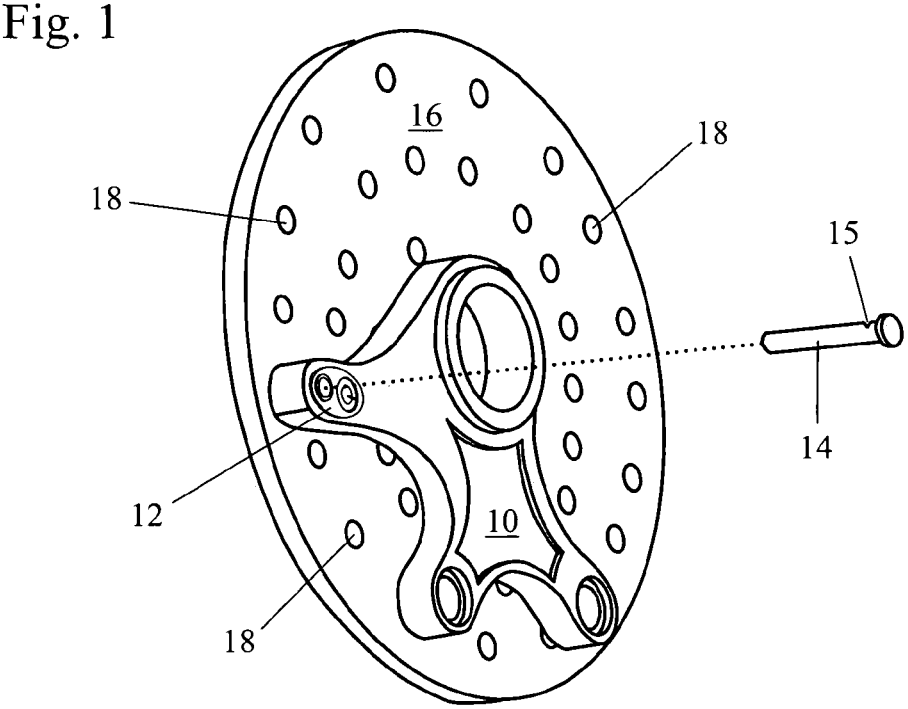
FIG. 1 shows a lock assembly on a rear brake caliper mounting bracket of a motorcycle in an embodiment of the present invention.

The vehicle lock of the present invention is preferably used on a wheeled vehicle, including, but not limited to, a motorcycle, a moped, an all-terrain vehicle (ATV), or a snowmobile, to immobilize at least one wheel or track. The vehicle lock may be used on any vehicle without a full enclosure of the operating controls, including locking doors or hatches, such that the vehicle could be moved manually. This includes any recreational-type vehicle with an open air rider position. The vehicle lock of the present invention prevents the vehicle from being wheeled anywhere when it is engaged.

When the vehicle lock of the present invention is used for a motorcycle, it is preferably designed to be integrated into the motorcycle's brake caliper mounting bracket or the brake caliper itself. A factory brake caliper bracket is subject to high amounts of lateral load at any given time during operation of the motorcycle. Lateral load on the axis of the bracket is transferred down the axis to the caliper bracket-to-frame mounting point. This is where the axle passes through the bracket perpendicular to the bracket's axis at the vertex, transforming the lateral load into torsion. This torsion is absorbed by the axle and rear frame of the motorcycle.

When the rear brake is applied to a motorcycle, the brake pads in the brake caliper press against the lateral surfaces of the rotating brake rotor. Friction is created and the kinetic energy from the momentum of the motorcycle is transferred from the brake rotor to the brake caliper via the pads. The kinetic energy is transferred to the brake caliper via the lateral force. If the caliper is situated above the axle, the brake caliper is forced toward the front of the motorcycle. The caliper bracket holds the caliper in place. The lateral force previously transferred to the caliper is now transferred on the same plane to the caliper bracket, so it remains a lateral load. The lateral load travels down the axis of the caliper bracket to the vertex (where the axle passes through the bracket), and the energy is then transferred to the axle and rear frame via torsion (twisting force). The integrity of the brake caliper bracket is maintained, because it is designed to withstand high lateral forces created from a motorcycle in motion.

Motorcycle manufacturers determine exactly how much lateral and torsion load each bracket must withstand. The caliper bracket is subject to extremely high loads, yet it is inexpensive in design and manufacture. The vehicle lock of the present invention preferably does not alter the fundamental design of the manufacturer's brake caliper bracket. Instead, the vehicle lock of the present invention is preferably an addition to the bracket, much like the brake caliper itself.

The brake caliper bracket of a motorcycle, or even an automobile for that matter, is the strongest part of that vehicle. The lateral load exerted on the brake caliper bracket of a motorcycle traveling at 180 miles per hour (MPH) when the rider vigorously applies the brake is many times greater than the load exerted on a rotor lock by a human trying to roll a parked motorcycle forward.

In a preferred embodiment of the present invention, the lock bracket replaces the manufacturer's bracket. A deadbolt shaft, preferably made of hardened steel, stainless steel, titanium, tungsten, or boron, extends from the bracket to the brake rotor in a locked state to prevent any movement of the locked wheel with respect to the bracket, thereby making the vehicle undrivable. The strength of the bracket and the deadbolt shaft preserve the integrity of the lock and prevent or deter theft of the vehicle. The wrap-around design of the present invention encases the brake caliper in the same manner that the neighboring brake caliper does.

The lateral load exerted on the lock in the event of an attempted theft is shouldered by the deadbolt shaft, which passes through the cross-drilled ventilation hole of the brake rotor perpendicular to its axis. The deadbolt shaft is seated in the lock on either side by a bushing, which is preferably made of hardened steel. The "lateral load" state is preserved by the wrap-around design, and is transferred to the axle and frame in the same manner as the lateral loads captured by the brake caliper. If a single-sided lock were used, the lateral load would be converted into torsion at the deadbolt-to-rotor contact and the integrity of the brake caliper bracket would be compromised.

In a preferred embodiment, the lock is a motorcycle lock. The wrap-around design of the lock preserves the integrity of the locking mechanism even in the case of an extreme destruction event, such as if the bracket is cut by a cutting tool, such as a Dremel® tool, and removed from the rotor. In the event of bracket destruction, the wheel may no longer be completely immobilized, but the lock mechanism remains attached to the rotor. The wheel is not able to rotate fully, as the lock mechanism comes into contact with the brake caliper or the motorcycle frame within one revolution, thus keeping the motorcycle immobilized.

A lock of the present invention is an adaptation of the factory rear brake caliper bracket. The lock's construction preferably retains the factory measurements in regards to caliper mounting-point locations, frame mounting-point locations, and aesthetic finish. The bracket preferably meets or exceeds all standards of the original equipment manufacturer (OEM). However, the materials used for the construction yield a brake caliper bracket that withstands much higher lateral and torsion loads. The lock adds minimal weight to the rear of the motorcycle and does not hinder performance in any way.

Each vehicle lock of the present invention is preferably customized to a specific vehicle model. The lock body of the vehicle lock is preferably permanently mounted to the vehicle. When the vehicle lock is engaged, the user carries no more than a key to engage/disengage the lock. When the vehicle lock is disengaged, the user carries no more than the key and the brake bolt/deadbolt assembly, which is preferably of similar size and weight as the key.

Referring to FIG. 1, in a rear brake embodiment, a vehicle lock of the present invention is a self-contained unit housed within the caliper mounting bracket (10). The caliper mounting bracket (10) is preferably of original equipment specifications to the applicable model of vehicle. The lock is preferably used on any vehicle using a disc braking system. Some vehicles upon which the lock of the present invention may be used include, but are not limited to, motorcycles, mopeds, ATVs, and snowmobiles. The locking mechanism (12) is securely mounted in the caliper mounting bracket (10). The locking mechanism (12) includes a locking cylinder (not shown) and an externally applied deadbolt shaft (14) with a locking notch (15) closer to one end to be locked into place. The deadbolt shaft (14), when locked, enters the rotor (16) through one of the plurality of cross-drilled ventilation holes (18).

The caliper mounting bracket (10) is preferably made of cast or milled aluminum or steel meeting or exceeding OEM-specified strength. The locking mechanism (12) is preferably made of strengthened steel housing the internal components creating a locking body able to secure the deadbolt shaft (14) into place through one of the cross-drilled ventilation holes (18).

Figure 2:
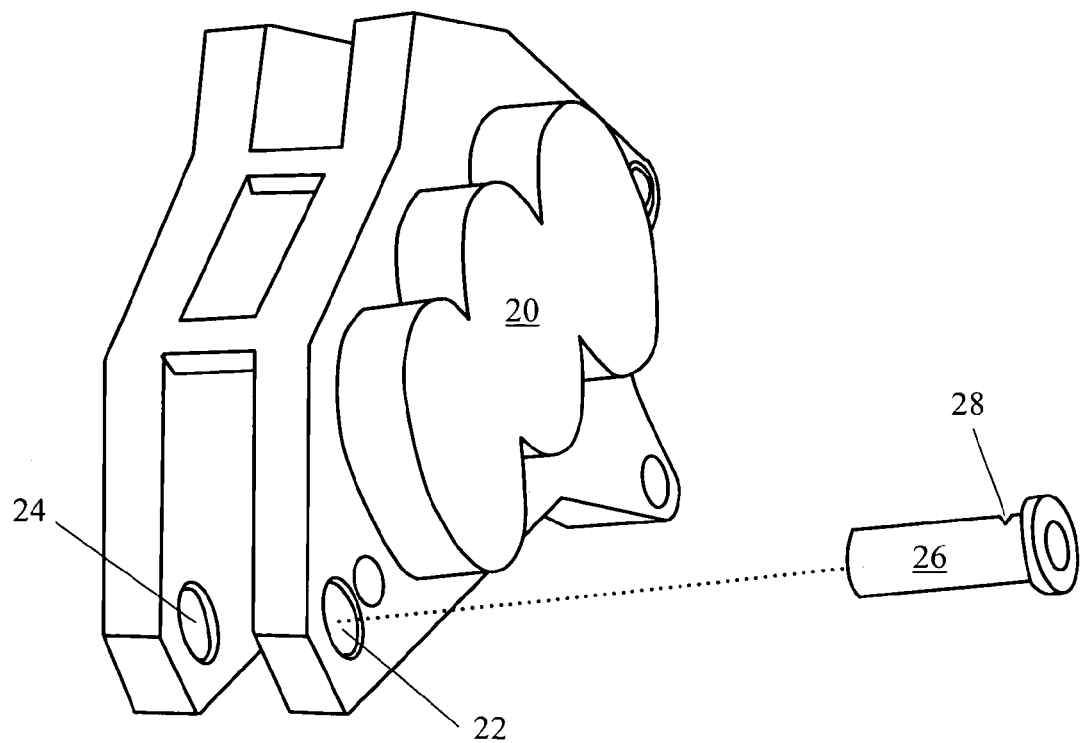
FIG. 2 shows a lock assembly on a front brake caliper housing in an embodiment of the present invention.

Referring to FIG. 2, in a front brake embodiment, a vehicle lock of the present invention is a self-contained unit housed within the caliper (20). The caliper (20) is preferably of original equipment specifications to each applicable model of vehicle. The lock is preferably used on any vehicle using a disc braking system. Some vehicles upon which the lock of the present invention may be used include, but are not limited to, motorcycles, mopeds, ATVs, and snowmobiles. The locking mechanism (22) is securely mounted in the caliper (20). Additionally, the caliper (20) employs a deadbolt receiver (24) on the opposite side of the locking mechanism (22) to ensure placement of the deadbolt shaft (26). In one embodiment, the deadbolt shaft is made of steel, strengthened steel, or stainless steel. However, the deadbolt shaft may be made of any metal or alloy of equal or greater tensile strength than steel, including, but not limited to, titanium, tungsten, or boron. The locking mechanism (22) includes a locking cylinder and an externally applied deadbolt shaft (26) with a locking notch (28) closer to one end to be locked into place. The deadbolt shaft (26), when locked, enters the rotor (not shown) through one of the plurality of cross-drilled ventilation holes (not shown). The caliper (20) is preferably made of cast or milled aluminum meeting or exceeding OEM-specified strength. The locking mechanism (22) is preferably made of strengthened steel housing the internal components creating a locking body able to secure the deadbolt shaft (26) into place.

Figure 3:
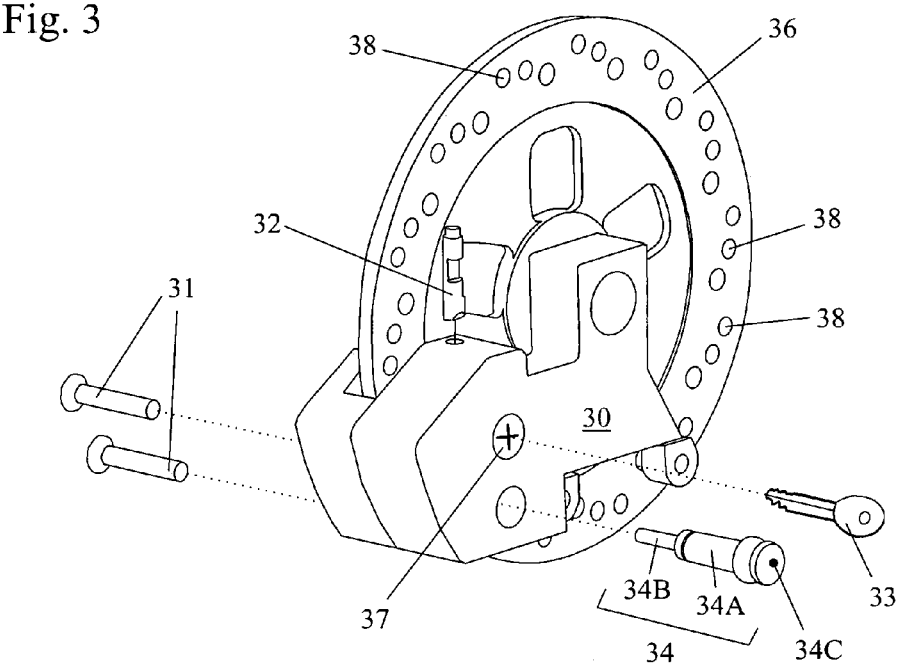
FIG. 3 shows a lock assembly in an embodiment of the present invention.

Referring to FIG. 3, a bracket (30) of the present invention is mounted to the brake rotor (36) by at least one mounting screw (31). The locking pin (32) holds the brake bolt (34) in place in the bracket (30). In a locked state, the deadbolt shaft (34B) extends from the brake bolt body (34A) and into a ventilation hole (38) of the brake rotor (36) to prevent rotation of the rotor (36) and hence the wheel or track, thereby locking the vehicle. One or more light emitting diodes (LED's) (34C) may be mounted on the brake bolt body (34A) or the bracket (30) to indicate to the user whether or not the lock is engaged for added safety and security. In this embodiment, a key (33), which is preferably a four-way key, is inserted into a keyhole of the key cylinder (37) and turned to engage and disengage the lock. In one embodiment of the engagement mechanism, the key (33) unlocks the brake bolt (34) by releasing the locking pin (32) from the locked position. The key cylinder (37) is mounted in the body of the bracket (30) itself. In this embodiment, the only part that has a positive engaging lock is the brake bolt body (34A).

Figure 4:
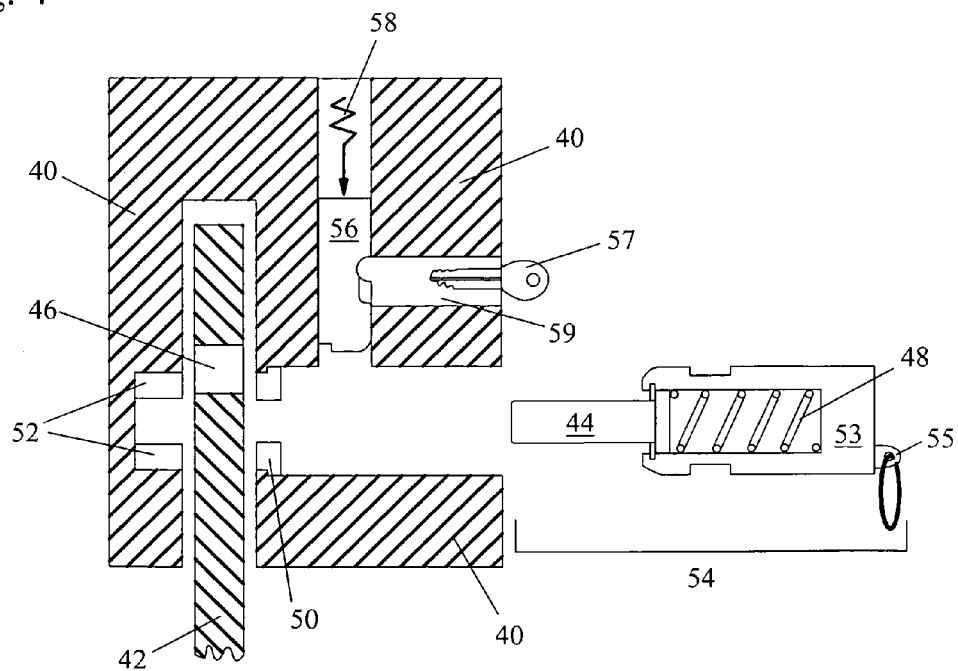
FIG. 4 shows a first lock mechanism of the present invention in an unlocked state with the brake bolt removed.

Several different mechanisms may be used with the present invention to engage and disengage the vehicle lock. In a first embodiment, shown in FIG. 4 through FIG. 6, a key manually unlocks the brake bolt and retraction of the spring-loaded locking pin allows the brake bolt assembly, including the deadbolt and the deadbolt spring to be removed from the bracket. Referring to FIG. 4, a lock mechanism of the present invention is preferably located in the bracket (40), which is mounted in place of the original bracket of the vehicle. The mounted bracket (40) preferably surrounds at least part of the brake rotor (42). To disengage the lock for use of the vehicle, the user inserts and turns the key (57), which is preferably a multi-combination key with four key-ways, to turn the key cylinder (59). This retracts the locking pin (56) and allows the user to remove the brake bolt (54), which includes the deadbolt (44), the deadbolt spring (48), and the brake bolt body (53), from the bracket (40). The assembly preferably includes a pull ring (55) attached to the brake bolt body (53) to allow the user to remove the assembly (54) from the bracket (40). When the lock is unlocked, the brake bolt (54), which is preferably compact and lightweight, can be easily stored by the owner, for example in the owner's pocket. In a preferred embodiment, the pull ring (55) is a keychain loop, so that the brake bolt (54) may be easily stored, for example by fastening the brake bolt to the owner's belt or another keychain.

Figure 5:
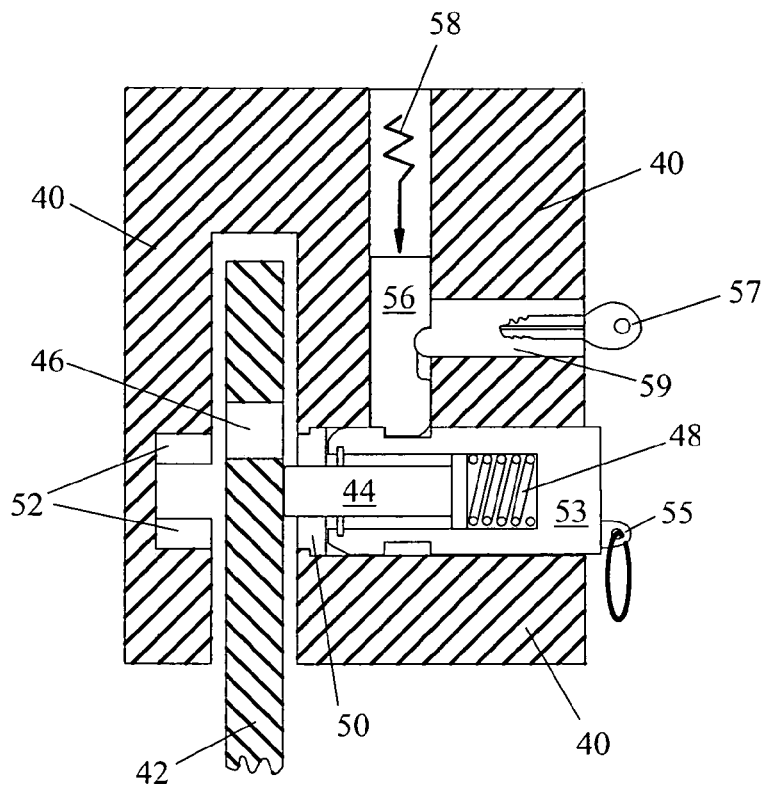
FIG. 5 shows the lock mechanism of FIG. 4 in an unlocked state with the brake bolt attached.

Referring to FIG. 5, to engage the lock, the user first inserts the brake bolt (54) into the bracket (40) and turns the key (57) to the lock position. This turns the key cylinder (59) to allow the locking pin spring (58) to urge the locking pin (56) toward the brake bolt (54) and engage the brake bolt body (53) so that it holds the brake bolt (54) in place.

Figure 6:
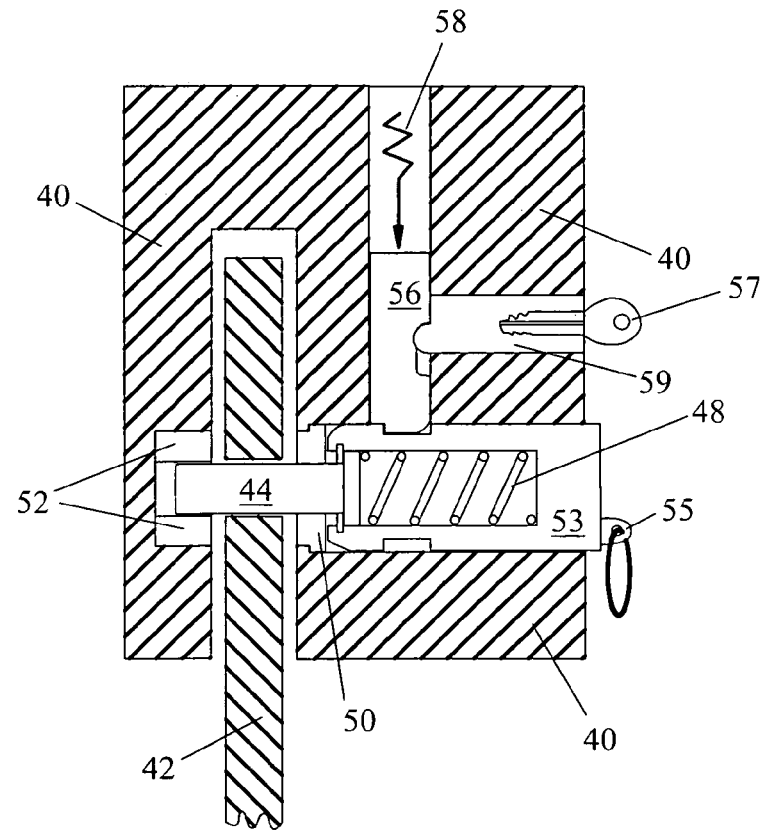
FIG. 6 shows the lock mechanism of FIG. 4 in a locked state.

Referring to FIG. 6, to complete the engagement of the lock, since the brake rotor (42) rotates with respect to the bracket (40) when unlocked, to lock the vehicle the user rolls the vehicle forward or backward until one of the ventilation holes (42) lines up with the deadbolt shaft (44). When the shaft (44) is aligned with a hole (42), the deadbolt spring (48) urges the shaft (44) through the hole (42) to engage the lock and prevent further movement of the brake rotor (42). The deadbolt (44) preferably extends into bushings (50, 52), which are preferably made of hardened steel, on either side of the brake rotor (42) to increase the strength of the lock. The deadbolt spring (48) is mounted in the brake bolt (54). The brake bolt (54) is held in position by the locking pin (56) that is urged toward the brake bolt (54) by the locking pin spring (58).

Figure 7:
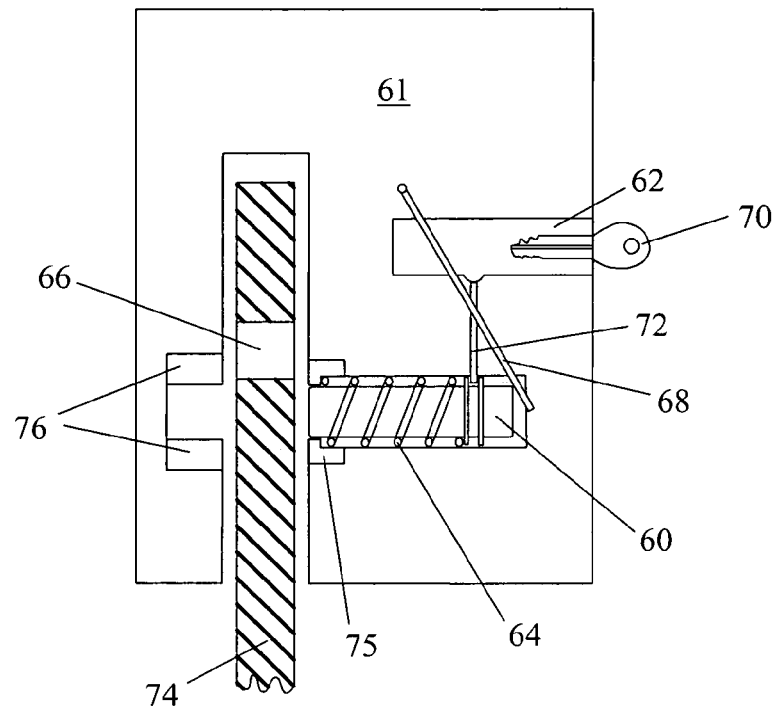
FIG. 7 shows a second lock mechanism of the present invention in an unlocked state.

In a second engagement embodiment, the deadbolt (60) is an internal part of the mounted bracket (61). In an unlocked state as shown in FIG. 7, the lock cylinder (62) is positioned such that the deadbolt retainer spring (64) has extended to retract the deadbolt (60) from the ventilation hole (66) and to move the hinged pin engagement bar (68) to the unlock position. When the key (70) and lock cylinder (62) are completely turned to release the lock, the fail-safe lock out plate (72) secures the internal deadbolt (60) to prevent accidental engagement while the lock is not in use.

Figure 8:
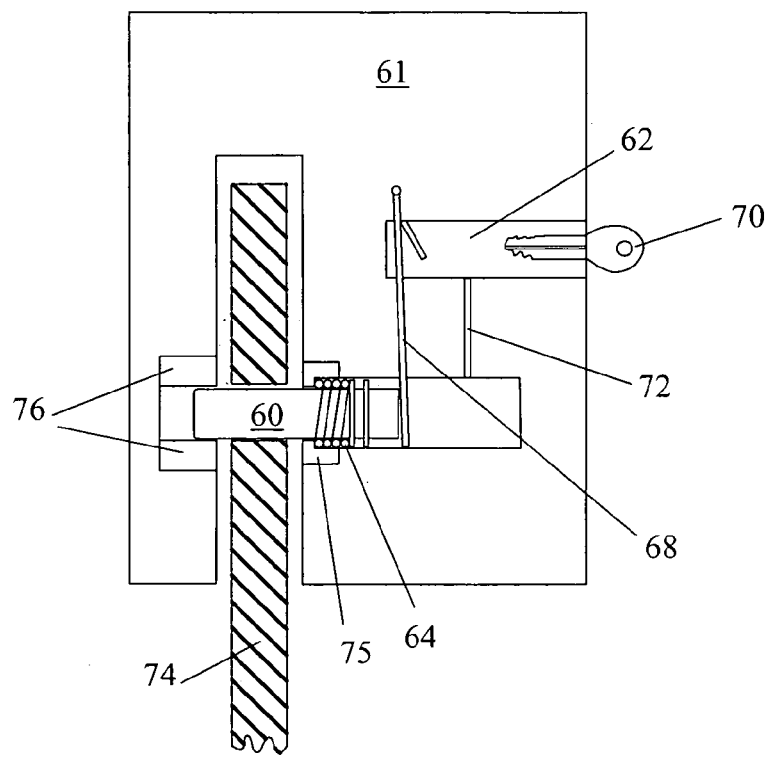
FIG. 8 shows the lock mechanism of FIG. 7 in a locked state.

To go to the locked position of FIG. 8, the lock cylinder (62) is turned with the appropriate key (70), which retracts the fail-safe lock out plate (72) and depresses the hinged pin engagement bar (68) pressing on the internal deadbolt (60), going through the ventilation rotor hole (66) of the brake rotor (74). The key then turns in reverse to take pressure off the hinged pin engagement bar, allowing the internal pin (60) to be retracted by the internal pin retainer spring (64). As in the previous embodiment, the deadbolt (60) preferably extends into bushings (75, 76), which are preferably made of hardened steel, on either side of the brake rotor (74) to increase the strength of the lock.

The deadbolt (60) remains mounted in the bracket (61) in both a locked and an unlocked state. The key (70) is the only removable part, allowing for even more convenience when it comes to lock storage. Although a specific pin extraction mechanism and fail-safe lock out mechanism are shown in this embodiment, other extraction and lock out mechanisms may be used within the spirit of the present invention. In an alternate embodiment, the lock cylinder may be directly attached to the deadbolt shaft to apply the pressure needed to push the shaft through the ventilation hole, allowing the rotor to be locked. In an alternate embodiment, a plate covers the brake bolt hole in the lock bracket to secure the brake bolt inside the housing to eliminate accidental engagement.

In a third engagement embodiment, the lock is engaged and disengaged electronically. When the user turns on the ignition, the lock disengages, and when the user turns off the ignition, the lock engages. The lock is preferably wired in with the electronics on the vehicle. When the ignition is turned on, the solenoid acts as the lock cylinder, facilitating all the internal movements of the deadbolt and the metal plate blocking the accidental engagement. The installation may be done by the owner and purchaser. If the lock is wired in with the vehicle's electronics, then dealer installation is preferable. The electronic control may additionally use radio frequency identification (RFID) technology with an external power source for an increased level of security and correct owner identification. The RFID also eliminates the need to use the motorcycle's power supply for correct lock function. If the lock uses RFID technology, the installation is similar to installation of the mechanical key embodiments. No wiring is necessary because the power source is external. In this embodiment, the entire vehicle lock is permanently mounted to the vehicle, and the user does not even need to carry a key for the vehicle lock.

For any of these embodiments, one or more light-emitting diodes (LED's) may be housed in the brake bolt or the bracket to indicate to the user whether or not the lock is engaged for added safety and security.

Although all of the described embodiments include only a single deadbolt engaging the rotor, multiple deadbolts may be used to engage multiple ventilation holes in the rotor simultaneously for increased security within the spirit of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A vehicle lock for a vehicle having at least one wheel or track having a brake rotor with a plurality of ventilation holes or slots, the vehicle lock comprising:
    a lock body mounted to the vehicle in both a locked state and an unlocked state, the lock body comprising a locking pin; and
    a brake bolt comprising a brake bolt body and at least one deadbolt shaft, the brake bolt body is adapted to circumferentially receive the locking pin and mounted in the lock body in the locked state;
    wherein in the unlocked state the brake bolt is removed from the lock body for operation of the vehicle;
    wherein in the locked state the deadbolt shaft is biased to extend into at least one of the plurality of ventilation holes or slots, thereby preventing rotation of the brake rotor and the wheel or track;
    wherein the brake bolt is rotatable and unremoveable while the locking pin is extended to be circumferentially received in the brake bolt body.

2. The vehicle lock of claim 1, wherein the lock body is permanently mounted to the vehicle.

3. The vehicle lock of claim 1, wherein the lock body replaces a caliper housing or a caliper mounting bracket of the vehicle.

4. The vehicle lock of claim 1, wherein the brake bolt further comprises:
    a brake bolt body have a central bore; and
    a deadbolt spring located in the central bore and biasing the deadbolt shaft outward from the brake bolt body;
    wherein the deadbolt shaft extends from the central bore.

5. The vehicle lock of claim 4, wherein the brake bolt further comprises a keychain loop mounted to the brake bolt body.

6. The vehicle lock of claim 4 further comprising said locking pin located in the lock body is biased toward the brake bolt body by a locking pin spring.

7. The vehicle lock of claim 6 further comprising a lock cylinder actuated between a lock position and an unlock position by a key such that in the lock position, the lock cylinder allows the locking pin to extend to lock the brake bolt in the brake bolt body.

8. The vehicle lock of claim 4, wherein the lock body flanks both sides of at least a part of the brake rotor such that in the locked state the deadbolt shaft extends from the brake bolt body through the at least one ventilation hole or slot and into a recess in the brake body.

9. The vehicle lock of claim 8, wherein the deadbolt shaft extends through a first bushing at the end of the brake bolt and in the locked state the deadbolt shaft extends into a second bushing in the recess.

10. The vehicle lock of claim 1, wherein the deadbolt shaft is sized such that in the locked state all fore and aft movement of the wheel or track is prevented.

11. The vehicle lock of claim 1, wherein the vehicle lock is mechanically actuated by a key.

12. The vehicle lock of claim 1, wherein the deadbolt shaft is made of a material selected from the group consisting of:
    a) steel:
    b) hardened steel;
    c) stainless steel;
    d) tungsten;
    e) titanium, and
    f) boron.

13. The vehicle of lock of claim 1 further comprising at least one light-emitting diode mounted to the vehicle lock for indicating whether the lock is in the locked state or the unlocked state.

14. A method of providing a vehicle lock for a vehicle having at least one wheel or track with a caliper mounting bracket or caliper housing and a brake rotor having a plurality of ventilation holes or slots, the method comprising the steps of:
    a) mounting a lock body to the vehicle in both a locked state and an unlocked state, the lock body comprising a locking pin; and
    b) removing a brake bolt from the lock body to place the vehicle lock in the unlocked state for operation of the vehicle;
    wherein the brake bolt comprises a brake bolt body and at least one deadbolt shaft, the brake bolt body adapted to circumferentially receive a locking pin such that the brake bolt is rotatable and unremoveable while the locking pin is extended; and
    wherein the deadbolt shaft is biased to extend into at least one of the plurality of ventilation holes or slots to lock the vehicle.

15. The method of claim 14 further comprising the step of inserting a brake bolt into the lock body to place the vehicle lock in the locked state.

16. The method of claim 14 further comprising the step of operating the vehicle in an unlocked state with the brake bolt removed from the lock body.

* * * * *

UNITED STATES PATENT AND TRADEMARK OFFICE
CERTIFICATE OF CORRECTION

PATENT NO.         : 7,467,530 B2                           Page 1 of 1
APPLICATION NO. : 11/350573
DATED              : December 23, 2008
INVENTOR(S)        : Marc Torrado, Eric Xavier and Adam Xavier It is certified that error appears in the above-identified patent and that said Letters Patent is hereby corrected as shown below:

Section (75), Inventors:, "Mark Torrado" should be --Marc Torrado--;

Col. 8, claim 12, line 28, "steel:" should be --steel;--;

Col. 8, claim 12, line 32, "titanium," should be --titanium;--;

Col. 8, claim 13, line 34, "vehicle of lock" should be --vehicle lock--.

Signed and Sealed this

Seventeenth Day of March, 2009

JOHN DOLL
*Acting Director of the United States Patent and Trademark Office*